(12) United States Patent
Rowe et al.

(10) Patent No.: US 9,298,324 B1
(45) Date of Patent: Mar. 29, 2016

(54) CAPACITIVE TOUCH WITH TACTILE FEEDBACK

(71) Applicant: Amazon Technologies, Inc., Reno, NV (US)

(72) Inventors: Gabriel Isaiah Rowe, Fremont, CA (US); Lakshman Rathnam, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 418 days.

(21) Appl. No.: 13/794,591

(22) Filed: Mar. 11, 2013

(51) Int. Cl.
*G06F 3/01* (2006.01)
*G06F 3/044* (2006.01)

(52) U.S. Cl.
CPC .................................. *G06F 3/044* (2013.01)

(58) Field of Classification Search
CPC ........ G06F 3/045; G06F 3/044; G06F 3/0488
See application file for complete search history.

(56) References Cited

U.S. PATENT DOCUMENTS

| | | | | |
|---|---|---|---|---|
| 7,545,621 B2 * | 6/2009 | Haddad | | 361/220 |
| 8,310,148 B2 * | 11/2012 | Lee et al. | | 313/504 |
| 8,547,341 B2 * | 10/2013 | Takashima et al. | | 345/173 |
| 8,847,917 B2 * | 9/2014 | Park et al. | | 345/175 |
| 8,994,687 B2 * | 3/2015 | Yeh et al. | | 345/174 |
| 2011/0148812 A1 * | 6/2011 | Hente | | 345/174 |

* cited by examiner

*Primary Examiner* — Abbas Abdulselam
(74) *Attorney, Agent, or Firm* — Seyfarth Shaw LLP; Ilan N. Barzilay; Vamsi K. Kakarla

(57) ABSTRACT

Various embodiments provide a capacitive touch input element that is formed of a recess in a substrate. The size and shape of the recess are chosen such that a finger of a user will not contact the bottom or minima point of the recess, thereby, requiring pressure to be applied by the finger in order to make contact. Beneath the substrate is a capacitive sensing electrode designed to concentrate an electric field toward the minima point of the recess such that the finger must make contact with the minima point to effect a change in capacitance causing the capacitive touch element to provide input to an appropriate application.

25 Claims, 4 Drawing Sheets

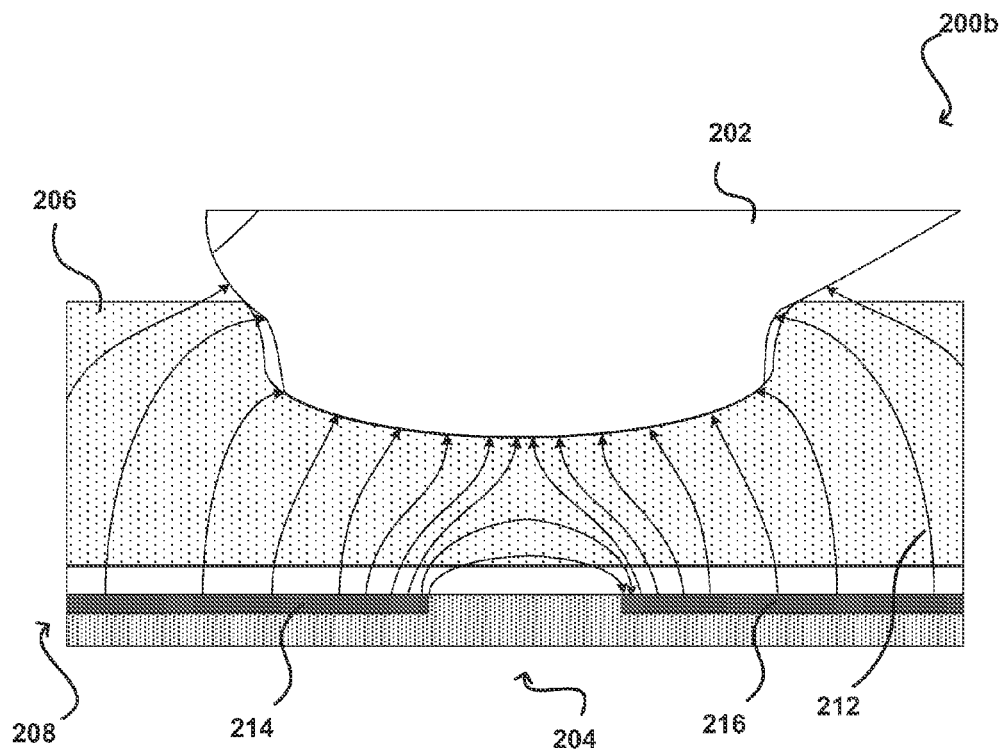
FIG. 2B
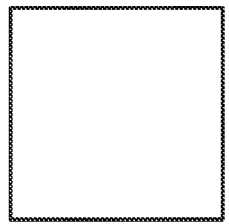 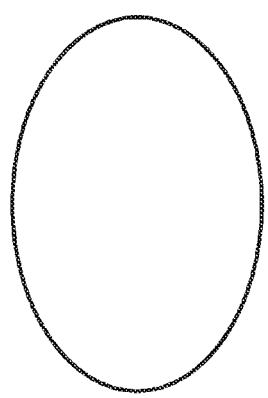 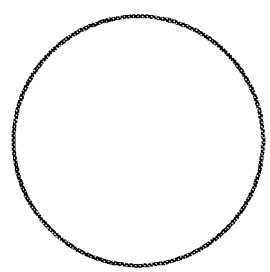
FIG. 3A　　　FIG. 3B　　　FIG. 3C

CAPACITIVE TOUCH WITH TACTILE FEEDBACK

BACKGROUND

People are increasingly utilizing a variety of computing devices, including portable devices such as tablet computers and smart phones. These devices typically often include touch-sensitive displays enabling a user to provide input to a device through contact with a display screen. These touch sensitive displays, or capacitive touch displays, typically include an insulator such as glass, coated with a transparent conductor above a display for a graphical user interface. Since the human body is an electrical conductor, touching the surface of the screen results in a distortion of the screen's electrostatic field, which is measurable as a change in capacitance. This measurable change in capacitance is used to detect the presence and location of a touch within the display area.

Capacitive touch displays, however, suffer from a number problems. For example, finding the location of a capacitive touch input element, such a virtual or graphical button rendered on a display, without an icon, LED, or any other sort of visual feedback is nearly impossible, whereas mechanical buttons stand out and can easily be found by tracing a finger over a surface. Further, placing and resting a finger, or other conductive body, on the surface of the capacitive touch input element cannot be definitively distinguished from an actual touch intended to provide input. High-pass filters have been used on the measurement data, however, these filters are difficult to tune, require a touch input elements to be measured at an increased frame rate, and are not typically used in practice due to their poor performance. Further, when pressing or selecting a capacitive touch input element, optimal placement of the finger is difficult without a feature on the glass to guide the finger. The touch signal, therefore, may vary depending on the user and can result in an actuation of the input not always occurring as expected. Conversely, with a mechanical button, the edges have a defined area that can be felt and which provide feedback to users in the form of a click or change in pressure against the finger. Therefore, as technology advances and as people are increasingly using portable computing devices in a wider variety of ways, it can be advantageous to adapt the ways in which capacitive touch input elements are provided to users and also how users provide input to the same.

BRIEF DESCRIPTION OF THE DRAWINGS

Various embodiments in accordance with the present disclosure will be described with reference to the drawings, in which:

FIGS. 2A-2B illustrate an example sequence of a user providing input to a capacitive touch button in accordance with at least one embodiment;

FIGS. 3A-3C illustrate example shapes of a capacitive touch button in accordance with at least one embodiment;

DETAILED DESCRIPTION

Systems and methods in accordance with various embodiments of the present disclosure may overcome one or more of the aforementioned and other deficiencies experienced in conventional approaches to enabling touch input to an electronic device. In particular, various approaches provide at least one capacitive touch input element that includes a feature to help guide a finger of a user (or other such object). For example, a capacitive touch input element (e.g., a capacitive "button") can be formed using a concave feature, such as a recess or indent, on cover glass above, or proximate to, a capacitive touch sensor. The capacitive touch sensor, in this example, includes an electrode structure designed to concentrate the electric field toward the bottom of the concave feature. Further, such a design concentrates the electric field in the material with high dielectric permittivity, such as glass, versus the air void, thereby, making the capacitive button less sensitive to the presence of an object, such as a finger, situated above the concave feature. Accordingly, if an air gap exists between the fingertip and the bottom of the concave feature the signal will remain low even if the finger is touching the rim of the concave feature.

In at least one embodiment, a capacitive touch input element is formed from a recess in a substrate. The size and shape of the recess are chosen such that a finger of a user will not contact the bottom, or minima point, of the recess without pressure being applied by the finger. Beneath the substrate is a capacitive sensing electrode structure designed to concentrate the electric field toward the minima point of the recess such that the finger must make contact with the minima point to effect a change in capacitance great enough to cause the capacitive touch element to provide input to an appropriate application. Such a design exploits the properties of the fringing electric field lines in proximity to a boundary between a high dielectric material of the substrate and a low dielectric material of the air void between the finger and the minima point.

Various other functions and advantages are described and suggested below as may be provided in accordance with the various embodiments.

Figure 1:
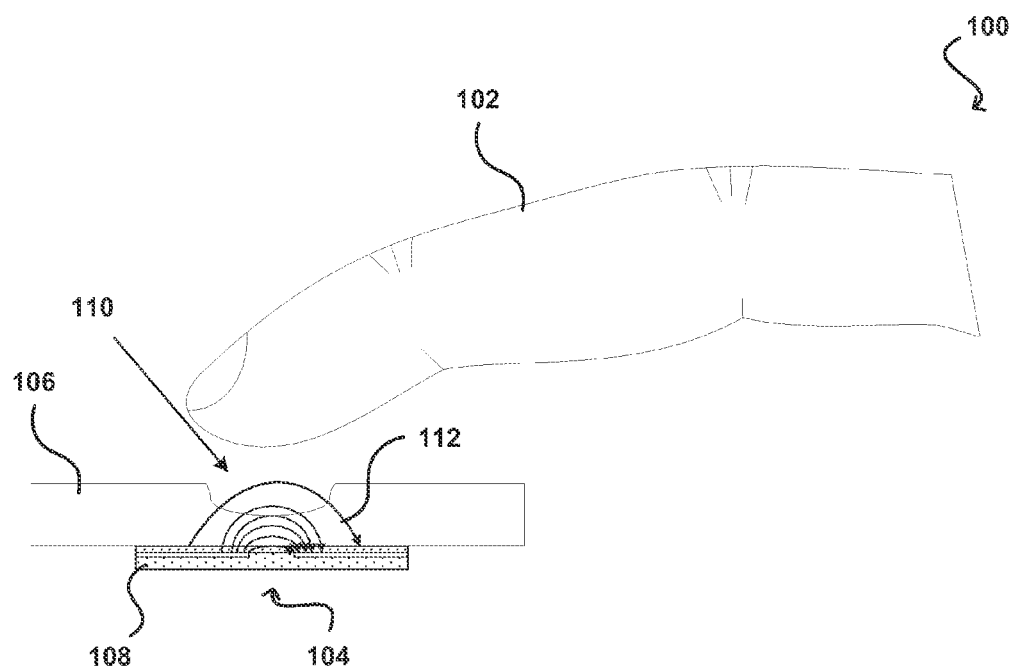
FIG. 1 illustrates an example view of a capacitive touch button in accordance with at least one embodiment.

FIG. 1 illustrates an example situation 100 showing a finger 102 of a user about to provide a touch input to a capacitive touch button 104. In this example, the capacitive touch button 104 is formed of an recess 110 in cover glass 106 and a capacitive sensing layer 108 patterned onto the cover glass 106 or flexible printed circuit board. In at least one embodiment, the recess 110 is formed of a size and shape such that a user's finger, or other such object, will not touch and make contact with the minima point of the recess 110 unless pressure is applied to push a portion of the finger into the recess 110. As used herein, the minima point of the recess 110 is the bottom most point, a central portion, or a point substantially at the center of the recess 110 by which pressure must be applied by the finger 102 to touch. In accordance with various embodiments, the cavity can be constructed so that the size, including at least one of a diameter, width, or depth, of the recess 110 is chosen, such that the finger will rest naturally on or near the top surface of the cover glass 106 without making contact with the minima point, thereby, allowing for an air gap to exist between the finger 102 and minima point. Therefore, in order to make contact with the minima point, a user must push the finger into the recess 110 by applying pressure to squeeze or force a portion of the finger into the recess 110. The act of pushing a portion of the finger into the cavity, indent, or recess 110, thereby, acts as a pseudo-force and the completion of the push event can provide the user with tactile feedback as the user feels their finger touch the bottom of the recess 110. Accordingly, the act of running or gliding the finger 102 over the surface of the cover glass 106, therefore, will not activate the capacitive touch button 104 and accidently provide an unintended input because the shape of the recess 110 requires flesh of the finger 102 to be pushed and deformed to fit into the recess 110 in order to effect a change in capacitance to a level to provide input.

Figure 2A:
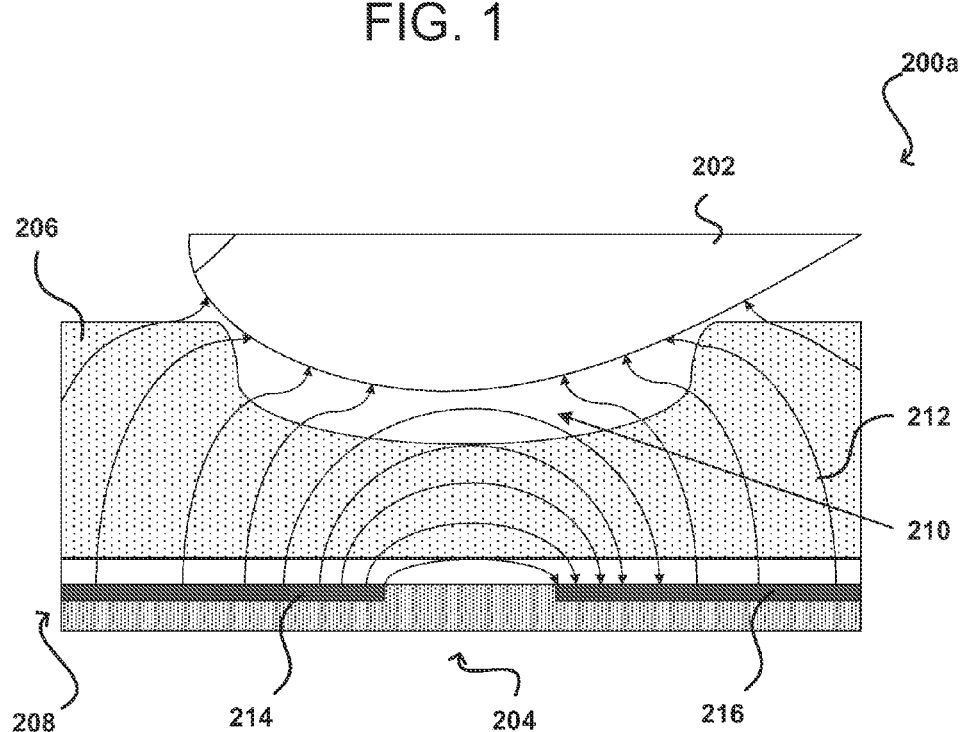

FIGS. 2A-2B illustrate an example 200 showing a sequence of a finger 202 providing a touch input to a capacitive touch button 204. As described above, the capacitive touch button 204 is formed of a recess 210 in a cover glass, or any other substrate, such as a plastic display cover, a plastic body of the computing device, and the like, above a capacitive sensing layer 208. In this example, the capacitive sensing layer 208 includes a TX electrode 214 and an RX electrode 216. When capacitive sensing is activated by applying a voltage to the TX electrode 214, change is drawn to the RX electrode 216 and the resulting electric field that this voltage creates is illustrated by electric field lines 212. In at least one embodiment, the TX electrode 214 and an RX electrode 216 are designed, or configured, to concentrate the electric field, represented by the electric field line 212 density, in an area associated with the minima point or bottom of the recess 210.

FIG. 2A illustrates an example illustration showing the finger 202 almost touching the rim of the recess 210. In this example, the finger 202 is close enough to the rim to redirect or attract some of the electric field lines 212, but not enough to effect a change in capacitance great enough to cause the capacitive touch button 204 to register a touch event and provide an input to a control circuit. In this example, since there is a gap or cavity of air between the finger 202 and the minima point of the recess 210, a change in capacitance will be detected, but will remain below threshold value, due to the relative difference between the permittivity of air and glass. In this example, permittivity is the measure of resistance that is encountered when forming an electric field in a medium or a measure of how an electric field affects, and is affected by, a dielectric medium. In other words, the electric field propagates much more efficiently in glass than it does in air, thereby making the capacitive touch button 204 much more sensitive to changes in capacitance when the finger 202 touches the glass as opposed to being slightly above the same. In at least one embodiment, a minimum capacitance or threshold value is chosen to tune the capacitive touch button 204 in order to only register a touch event when the finger 202 makes contact with the minima point, thereby, preventing light, unintended, or accidental touches.

In at least one embodiment, the capacitive value change dramatically when the finger 202 replaces the air cavity within the concave area of the recess 210. FIG. 2B illustrates an example showing the finger 202 making contact or touching the minima point of the recess 210. In this example, as the finger 202 makes contact with the minima point, almost all the electric field lines 212 are attracted to the finger 202, thereby, effecting a larger change in capacitance. The dramatic change in capacitance is due to the fact that fringing electric field lines 212 in close proximity to the sensor electrodes (TX electrode 214 and RX electrode 216), lower down in the cavity, have a greater intensity relative to field lines farther away and, therefore, comprise a greater percentage of the energy stored in the capacitive sensor.

The edges of the recess 210 can be designed to have distinguishing features that are detectable by the finger 202 as the user traces the finger 202 along the surface of the cover glass 106 or other such substrate. Further, the edges of the recess 210 are designed such that the finger naturally sits on the surface of the glass above the airgap or cavity. Thus, the recess 210 can be a hemispherical shape with abrupt edges such that the feature can be detected by the finger, but will remain on or near the surface of the glass unless pressure is applied. This can be accomplished by creating a feature that is slightly smaller than the pad of the finger 202. In one example, the shape of recess 210 can be similar to a contact lens that is etched away from the cover glass 206. In one example, the glass can be 0.7 mm thick, 0.35 mm thick at the minima point, and approximately 3 mm by 4 mm wide, forming an oval shape smaller than a pad of an average finger.

FIGS. 3A-3C illustrate example shapes of a recess in accordance with at least one embodiment. FIG. 3A is an illustration representing the shape of the recess as a square. FIG. 3B is an illustration representing the shape of the recess as an oval. FIG. 3C is an illustration representing the shape of the recess as a circle. Other shapes, such as a spherical shape, ellipse, rectangular, and the like, could also be used in accordance with various embodiments. Other shapes may also be used within the scope of various embodiments.

Figure 4A:
FIGS. 4A-4B illustrate example textures of a capacitive touch button in accordance with at least one embodiment.
Figure 4B:
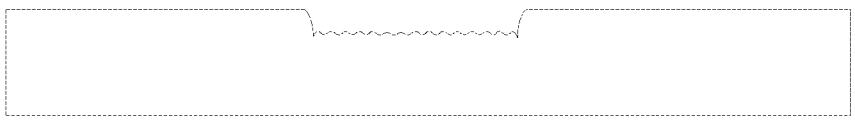

FIGS. 4A-4B illustrates example textures that could be used to provide tactile feedback for distinguishing the bottom or minima point of the recess. In this example, FIG. 4A illustrates a smooth spherical shaped recess and FIG. 4B illustrates a flat corrugated or micro-textured recess bottom. Potentially any shape, texture, or combination thereof will suffice as long as the recess requires a finger to squeeze into the normally air-filled void when the user applies some pressure. Further, in order to improve detectability without visual cues, the rim or edges of the recess could be also be mechanically transformed or etched to include a texture, chamfer, micro-texture, and the like to provide a tactile location queue for the user. Other textures and techniques may also be used within the scope of various embodiments.

Figure 5:
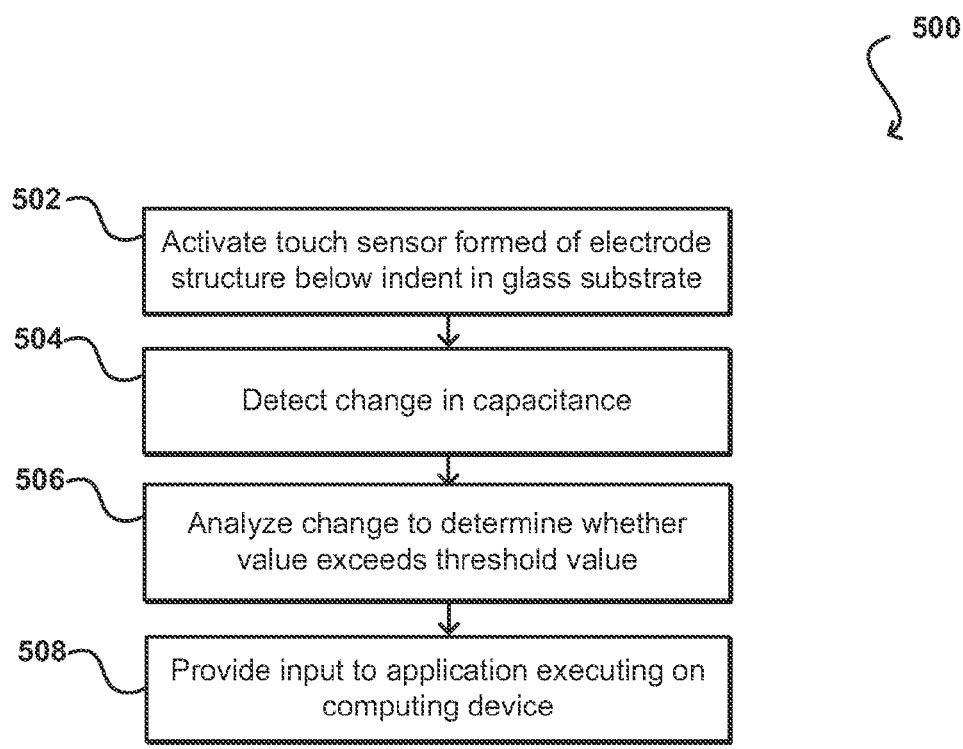
FIG. 5 illustrates an example process for detecting touch inputs with a capacitive touch button that can be used in accordance with at least one embodiment.

FIG. 5 illustrates an example process 500 for detecting a change in capacitance with a capacitance sensing element in accordance with various embodiments. It should be understood that, for any process discussed herein, there can be additional, fewer, or alternative steps performed in similar or alternative orders, or in parallel, within the scope of the various embodiments unless otherwise stated. In this example, a capacitive touch sensor on a computing device is activated 502. The capacitive touch sensor, in this example, is formed of an electrode structure below a recess on a glass substrate and the electrode structure is designed to concentrate an electric field between electrodes toward a minima point, or central portion, of the recess. In this example, a change in capacitance is detected 504. The change in capacitance is analyzed 506 to determine whether the value exceeds a threshold value indicative of a nominal finger, or other object, contacting the minima point of the recess. In response to the change in capacitance exceeding the threshold hold value, an input is provided 508 to an application executing on the computing device.

The capacitive touch element of various embodiments can include an insulator such as glass, coated with a transparent conductive film such as indium tin oxide (ITO). The transparent conductor is patterned into a plurality of capacitance sensing nodes or electrodes. Each node works independent of other nodes to produce concurrent signals that represent different points on the touch screen. The nodes may be based, for example, on self-capacitance or mutual capacitance. Self-capacitance refers to a configuration wherein changes in an electrode's capacitance are measured relative to a ground. For example, the electrodes can be patterned into spatially separated electrodes and traces. In this example, each electrode represents a different coordinate and the traces connect the electrodes to a sensing circuit and the circuit monitors each electrode for changes in capacitance. Since the human body is an electrical conductor, touching the surface of a touch screen results in a distortion of the screen's electrostatic field, which is measurable as a change in capacitance as an object, such as a user's finger, draws charge toward it and, thus, away from the electrode. The coordinates of electrodes where the changes in capacitance are sensed are used to recognize and locate a touch input.

Mutual capacitance refers to a state where changes in capacitance are measured between two electrodes. In this example, the electrodes are created by a two layer grid of conductive lines, or wires, separated from each other by a determined distance. The upper layer conductive lines could run along an x-axis (rows) of a plain, the lower layer could run along a y-axis (columns), and the separation between the upper and lower layers could be along a z-axis, for example. Sensing points can be provided at regions near the x-y intersections of the rows and columns. The rows can be charged, for example, resulting in the rows capacitively coupled to the columns. During operation, as a conductive object approaches the surface of the touch screen, the approaching object capacitively couples to the rows at the intersections in close proximity to the object, which steals charge away from the rows, thereby reducing the charge in the columns. The change in charge is measured by a circuit which can determine the position of one or more objects with respect to the grid.

Figure 6:
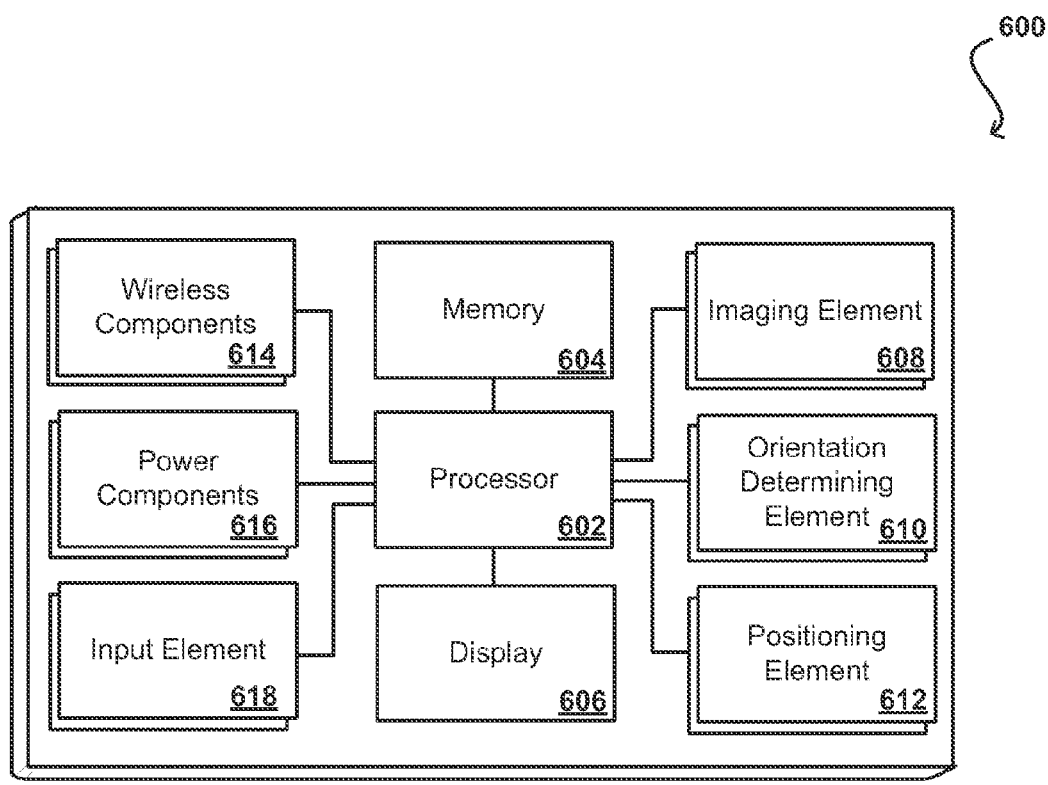
FIG. 6 illustrates example components that can be used with a device in accordance with at least one embodiment.

FIG. 6 illustrates a set of basic components of a computing device 600. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A portable computing device, comprising:
   a processor;
   a display element configured to display content through a cover glass;
   a pre-disposed recess in the cover glass above the display element, the recess and a minima point of the recess disposed in the cover glass in a manner such that contact with the minima point by an object requires an applied pressure by the object to move through the recess to contact the minima point;
   a capacitive sensing layer below the cover glass, the capacitive sensing layer operable to detect changes in capacitance, the capacitive sensing layer including an electrode formed to concentrate an electric field toward the minima point of the recess such that contact with the minima point of the recess made by the object causes a change in capacitance to provide an input; and
   memory including instructions that, when executed by the processor, enable the processor to receive data based on a signal from the capacitance sensing layer for providing the input to an application on the portable computing device.

2. The portable computing device of claim 1, wherein the object is a finger and a size and shape of the recess requires pressure to be applied by the finger to deform a portion of the finger to make contact with the minima point.

3. The portable computing device of claim 1, wherein the recess includes a texture.

4. The portable computing device of claim 1, wherein the signal is provided by the capacitive sensing layer when the change in capacitance exceeds a threshold value.

5. The portable computing device of claim 1, wherein the capacitive sensing layer detects a first change in capacitance value when the object makes contact with the cover glass and detects a second change in capacitance value when the object makes contact with the minima point, the signal being provided upon detecting the second change in capacitance value.

6. The portable computing device of claim 1, wherein a size and shape of the recess is smaller than the object requiring pressure to be applied by the object in order for the object to make contact with the minima point.

7. A capacitive touch element, comprising: a pre-disposed recess in a substrate; and a capacitive sensor positioned proximate the recess, the capacitive sensor configured to provide a signal corresponding to an input in response to an object making contact being pressed at least partially into the recess to make contact with the central portion of the recess and causing a change in capacitance, wherein contact between the object and the central portion of the recess requires an applied pressure by the object to move through the recess to contact the central portion of the recess, and wherein the capacitive sensor further comprises a capacitive sensing layer below the substrate, the capacitive sensing layer operable to detect changes in capacitance, the capacitive sensing layer including an electrode formed to concentrate an electric field substantially toward a central portion of the recess such that contact with the central portion of the recess made by the object causes the change in capacitance to provide the input.

8. The capacitive touch element of claim 7, wherein the substrate is at least one of glass, a glass touch screen, a plastic touch screen, or a plastic body of a computing device.

9. The capacitive touch element of claim 7, wherein the input is provided to an application executing on the computing device when the change in capacitance exceeds a threshold value corresponding to the object being pressed at least partially into the recess and making contact with the central portion of the recess.

10. The capacitive touch element of claim 7, wherein a size of the recess is smaller in size relative to the object such that the object will rest above the recess on the substrate without making contact with the central portion until pressure is applied by the object.

11. The capacitive touch element of claim 7, wherein the capacitive sensor provides a first signal corresponding to a first change in capacitance when the object makes contact with the substrate and provides a second signal corresponding to a second change in capacitance value when the object makes contact with the central portion.

12. The capacitive touch element of claim 7, wherein the recess is smaller in width than the object requiring pressure to be applied by the object in order for a portion of the object to fit into the recess to make contact with the central portion.

13. The capacitive touch element of claim 7, wherein the input is provided when a change in capacitance exceeds a threshold value, the threshold value being reached when the object makes contact with the central portion.

14. The capacitive touch element of claim 7, wherein the recess includes a texture.

15. A computer-implemented method, comprising:
    under the control of one or more computer systems configured with executable instructions,
        activating a capacitive touch sensor on a computing device, the capacitive touch sensor being positioned below a pre-disposed recess in a substrate and configured to generate and concentrate an electric field toward a central portion of the recess, and further configured to detect a change in capacitance; wherein the recess is disposed in the substrate in a manner such that contact with the central portion by an object requires an applied pressure by the object to move through the recess to contact the central portion;
        detecting a change in capacitance;
        analyzing the change in capacitance to determine whether a value of the change in capacitance exceeds a threshold value indicative of the object contacting the central portion; and
        in response to the change in capacitance exceeding the threshold value, providing an input to an application executing on the computing device.

16. The computer-implemented method of claim 15, further comprising detecting a capacitance value below the threshold value in response to the object resting on the substrate above the capacitive touch sensor without the object making contact with the central portion.

17. The computer-implemented method of claim 15, wherein the recess is smaller in size and shape than the object requiring pressure to be applied by the object in order for the object to make contact with the central portion.

18. The computer-implemented method of claim 15, further comprising:
    detecting a first change in capacitance value in response to the object making contact with the substrate; and
    detecting a second change in capacitance value in response to the object making contact with the central portion, wherein the second change in capacitance value exceeds the threshold value.

19. The computer-implemented method of claim 15, wherein the recess includes a texture.

20. The computer-implemented method of claim 15, wherein the substrate is at least one of glass, a glass touch screen, a plastic touch screen, or a plastic body of the computing device.

21. A non-transitory computer-readable storage medium storing instructions that, when executed by at least one processor, cause a computing device to:
   activate a capacitive touch sensor on the computing device, the capacitive touch sensor being positioned below a pre-disposed recess in a substrate and configured to generate and concentrate an electric field toward a central portion of the recess, and further configured to detect a change in capacitance, wherein the recess is disposed in the substrate in a manner such that contact with the central portion by an object requires an applied pressure by the object to move through the recess to contact the central portion;
   detect a change in capacitance;
   analyze the change in capacitance to determine whether a value of the change in capacitance exceeds a threshold value indicative of the object contacting the central portion; and
   in response to the change in capacitance exceeding the threshold value, provide an input to an application executing on the computing device.

22. The non-transitory computer-readable storage medium of claim 21, wherein the instructions, when executed, further cause the computer device to detect a capacitance value below the threshold value in response to the object resting on the substrate above the capacitive touch sensor without making contact with the central portion.

23. The non-transitory computer-readable storage medium of claim 21, wherein the instructions, when executed, further cause the computer device to:
   detect a first change in capacitance value in response to the object makes contact with the substrate; and
   detect a second change in capacitance value in response to the object making contact with the central portion, wherein the second change in capacitance value exceeds the threshold value.

24. The non-transitory computer-readable storage medium of claim 21, wherein the substrate is at least one of glass, a glass touch screen, a plastic touch screen, or a plastic body of the computing device.

25. The non-transitory computer-readable storage medium of claim 21, wherein the recess is smaller in size and shape than the object requiring pressure to be applied by the object in order for the object to make contact with the central portion.

* * * * *